United States Patent
Horiguchi et al.

(10) Patent No.: US 11,175,520 B2
(45) Date of Patent: Nov. 16, 2021

(54) OPTICAL SEMICONDUCTOR DEVICE AND METHOD FOR MANUFACTURING THE SAME

(71) Applicant: Mitsubishi Electric Corporation, Chiyoda-ku (JP)

(72) Inventors: Yuichiro Horiguchi, Chiyoda-ku (JP); Satoshi Nishikawa, Chiyoda-ku (JP); Koichi Akiyama, Chiyoda-ku (JP); Keigo Fukunaga, Chiyoda-ku (JP); Yohei Hokama, Chiyoda-ku (JP); Yosuke Suzuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/960,392

(22) PCT Filed: Oct. 2, 2018

(86) PCT No.: PCT/JP2018/036805
§ 371 (c)(1),
(2) Date: Jul. 7, 2020

(87) PCT Pub. No.: WO2019/155679
PCT Pub. Date: Aug. 15, 2019

(65) Prior Publication Data
US 2020/0387017 A1    Dec. 10, 2020

(30) Foreign Application Priority Data
Feb. 9, 2018    (JP) .............................. JP2018-022223

(51) Int. Cl.
*G02F 1/035* (2006.01)
*G02F 1/025* (2006.01)
*B29D 11/00* (2006.01)

(52) U.S. Cl.
CPC ........ *G02F 1/025* (2013.01); *B29D 11/00673* (2013.01)

(58) Field of Classification Search
CPC .............. G02F 1/025; B29D 11/00673; B29D 11/00663
See application file for complete search history.

(56) References Cited

U.S. PATENT DOCUMENTS

| 5,757,985 A * | 5/1998 | Ishizaka ................ G02F 1/2257 385/2 |
| 2008/0291960 A1* | 11/2008 | Inoue ........................ H01S 5/22 372/45.01 |

(Continued)

FOREIGN PATENT DOCUMENTS

| JP | 2000-75254 A | 3/2000 |
| JP | 2001-305498 A | 10/2001 |

(Continued)

OTHER PUBLICATIONS

International Search Report dated Jan. 8, 2019 in PCT/JP2018/036805 filed on Oct. 2, 2018, 2 pages.

*Primary Examiner* — Ellen E Kim
(74) *Attorney, Agent, or Firm* — Xsensus LLP

(57) ABSTRACT

An optical semiconductor device includes a semiconductor substrate, a first semiconductor layer provided on the semiconductor substrate, and a mesa waveguide provided on the principal surface of the first semiconductor layer. The semiconductor device also includes a buried layer covering the upper surface of the first semiconductor layer. Part of the upper surface of the first semiconductor layer is exposed. A mesa structure provided at the boundary between a part of the first semiconductor layer is covered with the buried layer and a part of the first semiconductor layer is exposed. One side of the mesa structure is covered with the buried layer, and the other side is exposed. The optical semiconductor (Continued)

device can reduce the generation of stress in the buried layer, for example, to suppress the occurrence of cracks in the buried layer and enhance the reliability.

12 Claims, 7 Drawing Sheets

(56) References Cited

U.S. PATENT DOCUMENTS

| | | |
|---|---|---|
| 2014/0021160 A1 | 1/2014 | Kitamura et al. |
| 2014/0133794 A1* | 5/2014 | Kono ..................... G02F 1/225 385/3 |
| 2015/0023627 A1 | 1/2015 | Kimura et al. |
| 2018/0164654 A1* | 6/2018 | Ogiso ................... G02F 1/2257 |
| 2018/0275482 A1* | 9/2018 | Kitamura .......... H01L 21/76826 |

FOREIGN PATENT DOCUMENTS

| | | |
|---|---|---|
| JP | 2014-38322 A | 2/2014 |
| JP | 2015-21974 A | 2/2015 |

\* cited by examiner

FIG.5
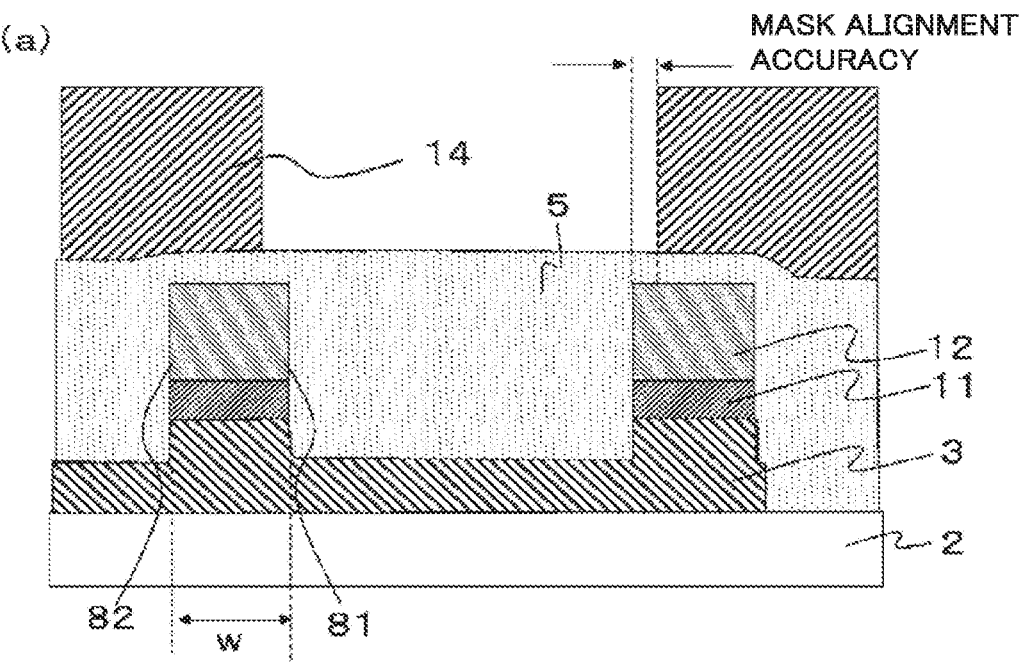
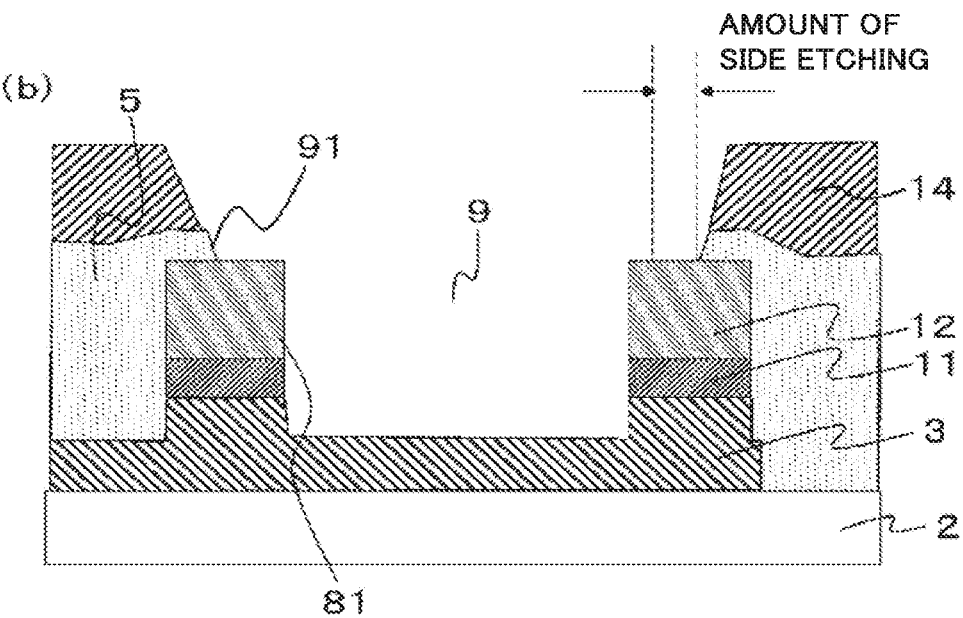

OPTICAL SEMICONDUCTOR DEVICE AND METHOD FOR MANUFACTURING THE SAME

TECHNICAL FIELD

The present invention relates to an optical semiconductor device and a method for manufacturing the same.

BACKGROUND ART

For example, a conventional optical semiconductor device for use in a Mach-Zehnder modulator includes a high-mesa optical waveguide constituted of: a lower cladding layer made of an n-type semiconductor layer provided on a semiconductor substrate, a core layer provided on the lower cladding layer and serving as an optical confinement layer having a multi quantum well (MQW) structure, and an upper cladding layer made of a p-type semiconductor layer provided on the core layer.

Such a conventional optical semiconductor device includes a buried layer made of resin containing, for example, benzocyclobutene (BCB). The buried layer covers the semiconductor substrate, the lower cladding layer, and the high-mesa optical waveguide. The buried layer has an opening reaching the principal surface of the lower cladding layer, and an opening reaching the upper surface of the optical waveguide. In the openings, electrodes are formed electrically connected to the lower cladding layer and the upper cladding layer, respectively.

PTL 1 discloses a method for manufacturing an optical semiconductor device for use in a Mach-Zehnder modulator, in which a high-mesa optical waveguide is covered with a buried layer made of resin, and electrodes are provided on the buried layer.

PTL 2 discloses a method for manufacturing an optical semiconductor device for use in a Mach-Zehnder modulator, in which a buried layer resin is applied twice to form a thick buried layer on a high-mesa optical waveguide.

CITATION LIST

Patent Literature

PTL 1: Japanese Patent Laying-Open No. 2014-38322
PTL 2: Japanese Patent Laying-Open No. 2015-21974

SUMMARY OF INVENTION

Technical Problem

In an optical semiconductor device for use in a Mach-Zehnder modulator as disclosed in PTLs 1 and 2, in order to provide an electrode on the principal surface of a lower cladding layer, an opening needs to be created in a buried layer so that the opening reaches the principal surface of the lower cladding layer.

However, in the optical semiconductor device as disclosed in PTLs 1 and 2, an opening that reaches the lower cladding layer makes a lateral side of the buried layer exposed over a thickness of several micrometers. Accordingly, during heating in the wafer processing or soldering for mounting the device, the temperature changes of the optical semiconductor device cause stress in the buried layer resin. This may cause stress concentration on the periphery of the opening in the buried layer, particularly on bent portions of the opening, thereby generating cracks in the buried layer resin. In some cases, the buried layer has an increased thickness to provide an increased distance between the electrode and the semiconductor. In such a case, in particular, the stress is increased and the problem of cracks is more conspicuous.

The present invention has been made to solve the problem of the conventional techniques. An object of the present invention is to provide an optical semiconductor device and a method for manufacturing the same that can reduce the generation of stress in a buried layer, for example, thereby suppressing the occurrence of cracks in the buried layer and enhancing the reliability.

Solution to Problem

To achieve the above object, an optical semiconductor device of the present invention includes: a semiconductor substrate; a first semiconductor layer provided on the semiconductor substrate; a mesa waveguide provided on a principal surface of the first semiconductor layer; a buried layer covering an upper surface of the first semiconductor layer, with a part of the upper surface of the first semiconductor layer being exposed; and a mesa structure provided at a boundary between a part of the first semiconductor layer that is covered with the buried layer and a part of the first semiconductor layer that is exposed, one side of the mesa structure being covered with the buried layer, the other side of the mesa structure being exposed.

A method for manufacturing an optical semiconductor device of the present invention includes: forming a first semiconductor layer on a semiconductor substrate; forming a mesa waveguide and a mesa structure on a principal surface of the first semiconductor layer; forming a buried layer covering the semiconductor substrate, the first semiconductor layer, the mesa waveguide, and the mesa structure; and exposing a part of the principal surface of the first semiconductor layer by removing a part of the buried layer, wherein the exposing includes exposing a part of the principal surface of the first semiconductor layer so that the buried layer remains on one side of the mesa structure and so that the other side of the mesa structure is exposed.

Advantageous Effects of Invention

An optical semiconductor device and a method for manufacturing the same can be provided that can reduce the generation of stress in a buried layer, for example, thereby suppressing the occurrence of cracks in the buried layer and enhancing the reliability.

BRIEF DESCRIPTION OF DRAWINGS

FIG. 5 shows cross-sectional views for explaining a process for forming a second opening of FIG. 3.

DESCRIPTION OF EMBODIMENTS

Embodiment 1

Figure 1:
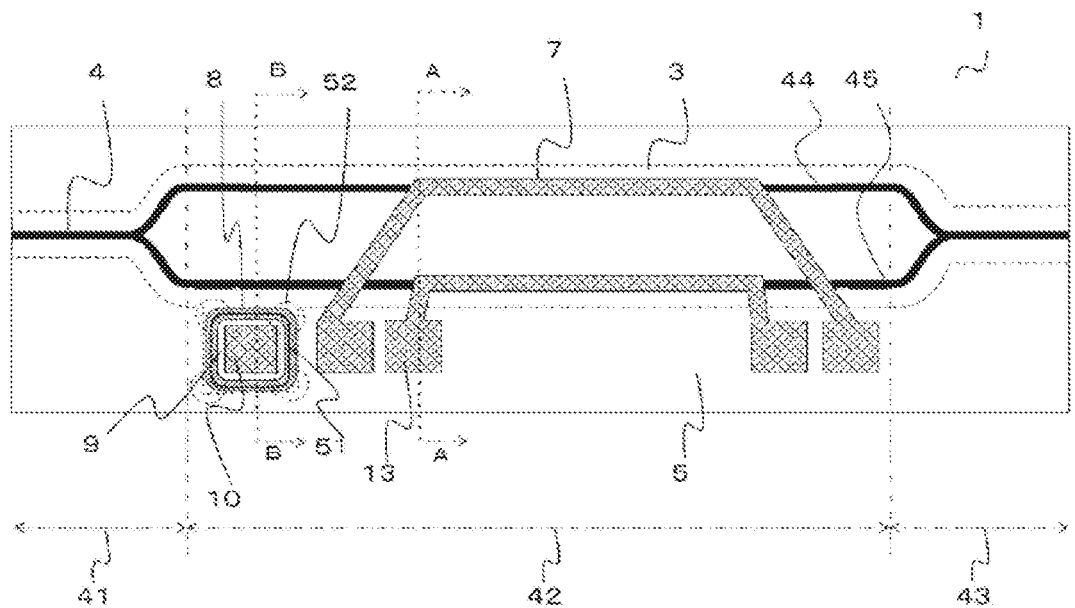
FIG. 1 shows a plan view illustrating a configuration of an optical semiconductor device in embodiment 1 of the present invention.

First, the configuration of an optical semiconductor device of the present invention is described with reference to the drawings. The drawings are schematic representations, which provide conceptual description of the functions and structures. The present invention is not limited to the embodiments described below. Unless otherwise specified, the optical semiconductor devices in all embodiments have the same basic configuration in common. Like reference numerals designate like or corresponding parts throughout the description.

Figure 2:
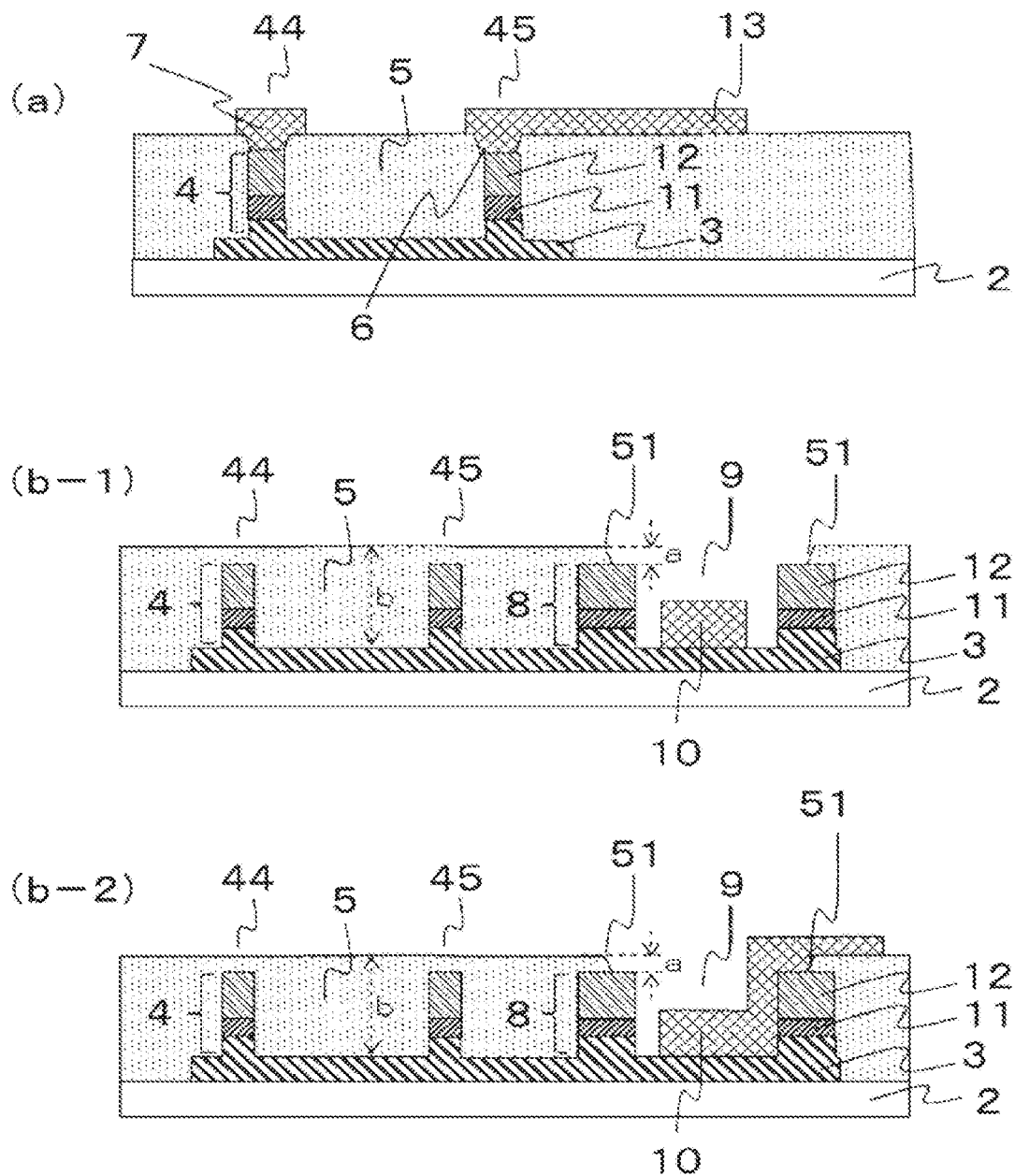
FIG. 2 shows cross-sectional views illustrating a configuration of the optical semiconductor device in embodiment 1 of the present invention.

FIG. 1 shows a plan view illustrating a configuration of an optical semiconductor device in embodiment 1 of the present invention. FIG. 2 shows cross-sectional views illustrating a configuration of the optical semiconductor device in embodiment 1 of the present invention. Specifically, FIG. 2(*a*) shows a cross-sectional view as seen from section line AA of FIG. 1, and FIG. 2(*b*-1) shows a cross-sectional view as seen from section line BB of FIG. 1. The present embodiment describes an optical semiconductor device for use in a Mach-Zehnder modulator as an example.

Optical semiconductor device 1 in embodiment 1 of the present invention includes: a semiconductor substrate 2; a first semiconductor layer 3 provided on semiconductor substrate 2 and having a first conductivity type; a mesa waveguide 4 provided on the principal surface of first semiconductor layer 3 and constituting an optical waveguide; a buried layer 5 covering semiconductor substrate 2, first semiconductor layer 3, and mesa waveguide 4; a first opening 6 in buried layer 5 through which the upper surface of mesa waveguide 4 is at least partially exposed; a first electrode 7 provided in first opening 6 and electrically connected to mesa waveguide 4; a second opening 9 in buried layer 5 through which the upper surface of first semiconductor layer 3 is exposed; a second electrode 10 provided on and electrically connected to first semiconductor layer 3 in second opening 9; and a mesa structure 8 provided on the principal surface of first semiconductor layer 3 and extending along a boundary 51 between second opening 9 and buried layer 5, where mesa structure 8 is partially covered with buried layer 5. Mesa structure 8 extends along boundary 51 between second opening 9 and buried layer 5 so that boundary 51 is located on the upper surface of mesa structure 8. Along boundary 51, a part of the upper surface of mesa structure 8 is exposed through second opening 9, while a part of the upper surface of mesa structure 8 on the opposite side from second opening 9 is covered with buried layer 5.

That is, optical semiconductor device 1 in the present embodiment includes: semiconductor substrate 2; first semiconductor layer 3 provided on semiconductor substrate 2; mesa waveguide 4 provided on the principal surface of first semiconductor layer 3; buried layer 5 covering the upper surface of first semiconductor layer 3, with a part of the upper surface of first semiconductor layer 3 being exposed; mesa structure 8 located at boundary 51 between a part of first semiconductor layer 3 that is covered with buried layer 5 and a part of first semiconductor layer 3 that is exposed, with one side of mesa structure 8 being covered with buried layer 5; and second electrode 10 provided on first semiconductor layer 3 and electrically connected to first semiconductor layer 3. Mesa structure 8 and boundary 51 surround second electrode 10. Second electrode 10 is provided on a part of first semiconductor layer 3 that is exposed.

Semiconductor substrate 2 is a semi-insulating semiconductor substrate made of, for example, a III-V compound semiconductor composed of Fe-doped indium phosphide (InP).

First semiconductor layer 3, which is of the first conductivity type and provided on semiconductor substrate 2, may be an n-type semiconductor layer having a thickness of 1.0 μm to 3.0 μm, for example. First semiconductor layer 3 is provided in the region defined by the dotted line in FIG. 1. Specifically, first semiconductor layer 3 electrically continuously extends over the lower region of mesa waveguide 4 constituted of a branch portion 41, a modulation portion 42, and a combining portion 43; and over the region with second electrode 10 surrounded by mesa structure 8. First semiconductor layer 3 is, for example, an n-type III-V compound semiconductor composed of S-doped indium phosphide (InP).

The upper-layer part of first semiconductor layer 3, which constitutes a lower cladding layer of mesa waveguide 4, may have a lower impurity concentration; while the lower-layer part of first semiconductor layer 3 may have a higher impurity concentration so as to reduce the contact resistance that would be caused by the formation of electrode.

Mesa waveguide 4 includes branch portion 41, modulation portion 42, and combining portion 43, as shown in FIG. 1. Mesa waveguide 4, extending from branch portion 41 through modulation portion 42 to combining portion 43, serves as an optical waveguide. In modulation portion 42, mesa waveguide 4 includes a plurality of mesa waveguides including a first optical waveguide 44 and a second optical waveguide 45 which are arranged in parallel. Specifically, in branch portion 41, a single optical waveguide branches into first optical waveguide 44 and second optical waveguide 45 which extend through modulation portion 42. Then, in combining portion 43, first optical waveguide 44 and second optical waveguide 45 are combined.

As shown in FIG. 2, mesa waveguide 4 is constituted of: a lower cladding layer which constitutes a part of first semiconductor layer 3; a core layer 11 formed on first semiconductor layer 3 and constituting a second semiconductor layer; and a third semiconductor layer 12 formed on core layer 11 and constituting an upper cladding layer, where third semiconductor layer 12 is of the p type different from the n type. Mesa waveguide 4 has a high-mesa structure having a high aspect ratio, with a width of 1.0 μm to 2.0 μm and a height of 3.0 μm to 5.0 μm.

Core layer 11 serves as an optical confinement layer of the optical waveguide. Core layer 11 is, for example, a semiconductor layer composed of AlGaInAs or InGaAsP and having a multi quantum well (MQW) structure, with a thickness of 0.3 μm to 0.6 μm. Core layer 11 may be composed of a stack of layers having different material ratios.

P-type third semiconductor layer 12, which constitutes an upper cladding layer, is a p-type III-V compound semiconductor layer composed of, for example, Zn-doped indium phosphide (InP), with a thickness of 1.5 μm to 2.5 μm, for example. In order to reduce the contact resistance that would be caused by the formation of first electrode 7 in modulation portion 42, the upper part of p-type third semiconductor layer 12 may have a higher impurity concentration, or a Zn-doped p-type indium gallium arsenide (InGaAs) layer having a higher impurity concentration may be formed on the p-type III-V compound semiconductor.

Buried layer 5 entirely covers optical semiconductor device 1, so as to cover semiconductor substrate 2, first semiconductor layer 3, and mesa waveguide 4.

Buried layer 5 is made of resin, such as resin containing benzocyclobutene (BCB) or polyimide resin.

First opening 6 is, as shown in FIG. 2(a), provided in buried layer 5 so that the upper surface of mesa waveguide 4 of first optical waveguide 44 and second optical waveguide 45 in modulation portion 42 is at least partially exposed. That is, third semiconductor layer 12, which is the upper layer of mesa waveguide 4 and constitutes an upper cladding layer, is exposed.

First electrode 7 is, as shown in FIG. 2(a), provided in first opening 6 at each of first optical waveguide 44 and second optical waveguide 45 of modulation portion 42, so that first electrode 7 is electrically connected to p-type third semiconductor layer 12 which constitutes an upper cladding layer on the upper side of mesa waveguide 4. First electrode 7 is made of, for example, titanium, platinum, or gold. Other materials may be selected as appropriate depending on the type of the semiconductor, such as a metal with tantalum, molybdenum, or niobium.

First electrode 7 is electrically connected to an electrode pad 13 on buried layer 5, so as to electrically connect to each of first optical waveguide 44 and second optical waveguide 45. Electrode pad 13 is made of, for example, titanium, platinum, or gold. Other materials may be selected as appropriate depending on the type of the semiconductor, such as a metal with tantalum, molybdenum, or niobium.

To electrode pad 13, a bonding wire (not shown) is bonded, so that an electrical signal can be externally input to optical semiconductor device 1 through first electrode 7 to change the phase of the branch light of each of first optical waveguide 44 and second optical waveguide 45 in modulation portion 42.

Second opening 9, as shown in FIG. 2(b-1), extends from the upper surface of buried layer 5 to the principal surface of n-type first semiconductor layer 3, for electrical connection between second electrode 10 and the lower layer of n-type first semiconductor layer 3.

Second electrode 10 is provided on a part of first semiconductor layer 3 that is exposed through second opening 9 at the bottom, below the upper surface of buried layer 5. Second electrode 10 is electrically connected to n-type first semiconductor layer 3. Second electrode 10 is made of, for example, titanium, platinum, or gold. Other materials may be selected as appropriate depending on the type of the semiconductor, such as a metal with tantalum, molybdenum, or niobium. To second electrode 10, a bonding wire (not shown) is bonded, so that an electrical signal can be externally input to optical semiconductor device 1 to change the phase of the branch light of each of first optical waveguide 44 and second optical waveguide 45.

In optical semiconductor device 1 in the present embodiment, the branch lights of first optical waveguide 44 and second optical waveguide 45 in modulation portion 42 can be changed in phase through the control of voltage application to first electrode 7 and second electrode 10.

Mesa structure 8 is, as shown in FIG. 1 and FIG. 2(b-1), provided on the principal surface of first semiconductor layer 3. Specifically, mesa structure 8 is located at boundary 51 between second opening 9 and buried layer 5. In the present embodiment, second opening 9 has a rectangular shape surrounding second electrode 10, and thus boundary 51 between second opening 9 and buried layer 5 has the same shape, with four bent portions 52 being formed at the four corners. Bent portions 52 are regions circled with broken lines in FIG. 1. Mesa structure 8 is located at boundary 51 between second opening 9 and buried layer 5. Mesa structure 8 is a high-mesa structure in the shape of a rectangle in planar view, including four bent portions 52 and surrounding the four sides of second electrode 10. The rectangle is, for example, a square with a side of 100 μm to 200 μm. As shown in FIG. 1, for example, each bent portion 52 of mesa structure 8 and boundary 51 between opening 9 and buried layer 5 may have the shape of a circular arc in planar view. In this case, the circular arc shape can distribute the stress in buried layer 5, thereby suppressing the occurrence of cracks in buried layer 5. While each bent portion 52 of mesa structure 8 and boundary 51 between opening 9 and buried layer 5 has the shape of a circular arc in planar view in this example, it may instead have the shape of a part of a polygon having an obtuse interior angle.

The present embodiment describes an example in which the four sides of second electrode 10 is surrounded by a high-mesa structure rectangular in planar view. Instead, however, as shown in FIG. 2(b-2), second electrode 10 may extend over a lateral side of second opening 9 to lead to the upper surface of buried layer 5, for example. In this case, the part where second electrode 10 is electrically connected to first semiconductor layer 3 is surrounded by mesa structure 8. This can make the wire bonding easier and can reduce the interference between electrodes when the optical semiconductor device is mounted. In the case in which second electrode 10 is led to the upper surface of buried layer 5, second electrode 10 may be formed on a lateral side of mesa structure 8, directly or with an insulating film interposed.

Similar to mesa waveguide 4, mesa structure 8 is covered with buried layer 5. However, as shown in FIG. 2(b-1), second opening 9 is provided on the side where mesa structure 8 faces second electrode 10, so that a part of the upper surface of mesa structure 8 and first semiconductor layer 3 are exposed through second opening 9. That is, mesa structure 8 extends along boundary 51 between second opening 9 and buried layer 5 so that boundary 51 is located on the upper surface of mesa structure 8. Second opening 9 is provided at the region where mesa structure 8 surrounds second electrode 10.

Accordingly, along boundary 51, a part of the upper surface of mesa structure 8 is exposed through second opening 9, while a part of the upper surface of mesa structure 8 on the opposite side from second opening 9 is covered with buried layer 5. Buried layer 5 is provided on a part of the upper surface of mesa structure 8 on the side where mesa structure 8 does not face second electrode 10, i.e., on the opposite side from second opening 9. The thickness of buried layer 5 on mesa structure 8 (i.e., the thickness indicated by "a" in FIG. 2(b-1)) is smaller than the thickness of buried layer 5 on the principal surface of first semiconductor layer 3 (i.e., the thickness indicated by "b" in FIG. 2(b-1)).

Similar to mesa waveguide 4, mesa structure 8 is constituted of: a lower cladding layer which constitutes a part of n-type first semiconductor layer 3; core layer 11 formed on n-type first semiconductor layer 3 and made of a second semiconductor layer; and third semiconductor layer 12 formed on core layer 11 and constituting an upper cladding layer, where third semiconductor layer 12 is of the p type different from the n type. Similar to mesa waveguide 4, mesa structure 8 has a high-mesa structure having a high aspect ratio. In the present embodiment, unlike mesa waveguide 4, mesa structure 8 is not electrically connected to first electrode 7 and thus does not constitute an optical waveguide.

Accordingly, in mesa structure 8 which is constituted of the lower cladding layer, the core layer, and the upper cladding layer, a part of the upper surface of third semiconductor layer 12 (upper cladding layer) is exposed through second opening 9. Boundary 51 between second opening 9 and buried layer 5 is located on the upper surface of third semiconductor layer 12 (upper cladding layer).

In order to allow buried layer 5 to remain on a part of the upper surface of mesa structure 8, mesa structure 8 preferably has a width of, for example, several to ten micrometers, in light of manufacturing variations in the accuracy of photoresist mask alignment and in the side etching amount during etching in the process for forming second opening 9, which will be described later. For example, mesa structure 8 having a greater width than mesa waveguide 4 can facilitate the process for forming second opening 9.

However, when semiconductor substrate 2, first semiconductor layer 3, mesa waveguide 4, and mesa structure 8 are covered with resin of buried layer 5, the resin is bumpy. Specifically, buried layer 5 is raised on mesa waveguide 4 and mesa structure 8. The raise of buried layer 5 defines the thickness of the buried layer above mesa structure 8 when second opening 9 is formed. A larger width of mesa structure 8 leads to a thicker buried layer 5 above mesa structure 8, thus leading to greater stress in buried layer 5. In view of this, in order to reduce the generation of stress in buried layer 5 by reducing the thickness of buried layer 5 above mesa structure 8, the width of mesa structure 8 is preferably as small as possible.

In optical semiconductor device 1 in the present embodiment with the above-described configuration, a signal light is externally input to branch portion 41. The signal light passes through branch portion 41, where the signal light branches into first optical waveguide 44 and second optical waveguide 45. In modulation portion 42, the signal lights (branch lights) of first optical waveguide 44 and second optical waveguide 45 are changed in phase through the control of voltage application to first electrode 7 and second electrode 10. The branch lights, which have been changed in phase, are combined in combining portion 43 to be output to the outside.

The optical semiconductor device in the present embodiment with the above-described configuration can reduce the generation of stress in buried layer 5, specifically at second opening 9 in buried layer 5, for example, thereby suppressing the occurrence of cracks in buried layer 5 and enhancing the reliability.

In the case in which second electrode 10 is led to the upper surface of buried layer 5, the optical semiconductor device in the present embodiment can also reduce the thickness of the lateral side of buried layer 5 on which second electrode 10 is provided. The reduced thickness of buried layer 5 can suppress the generation of bumps and dips on a lateral side of an opening that would be generated by the side etching in the process for forming second opening 9. Thus, the occurrence of peeling of electrode metal and disconnection can be suppressed.

Figure 3:
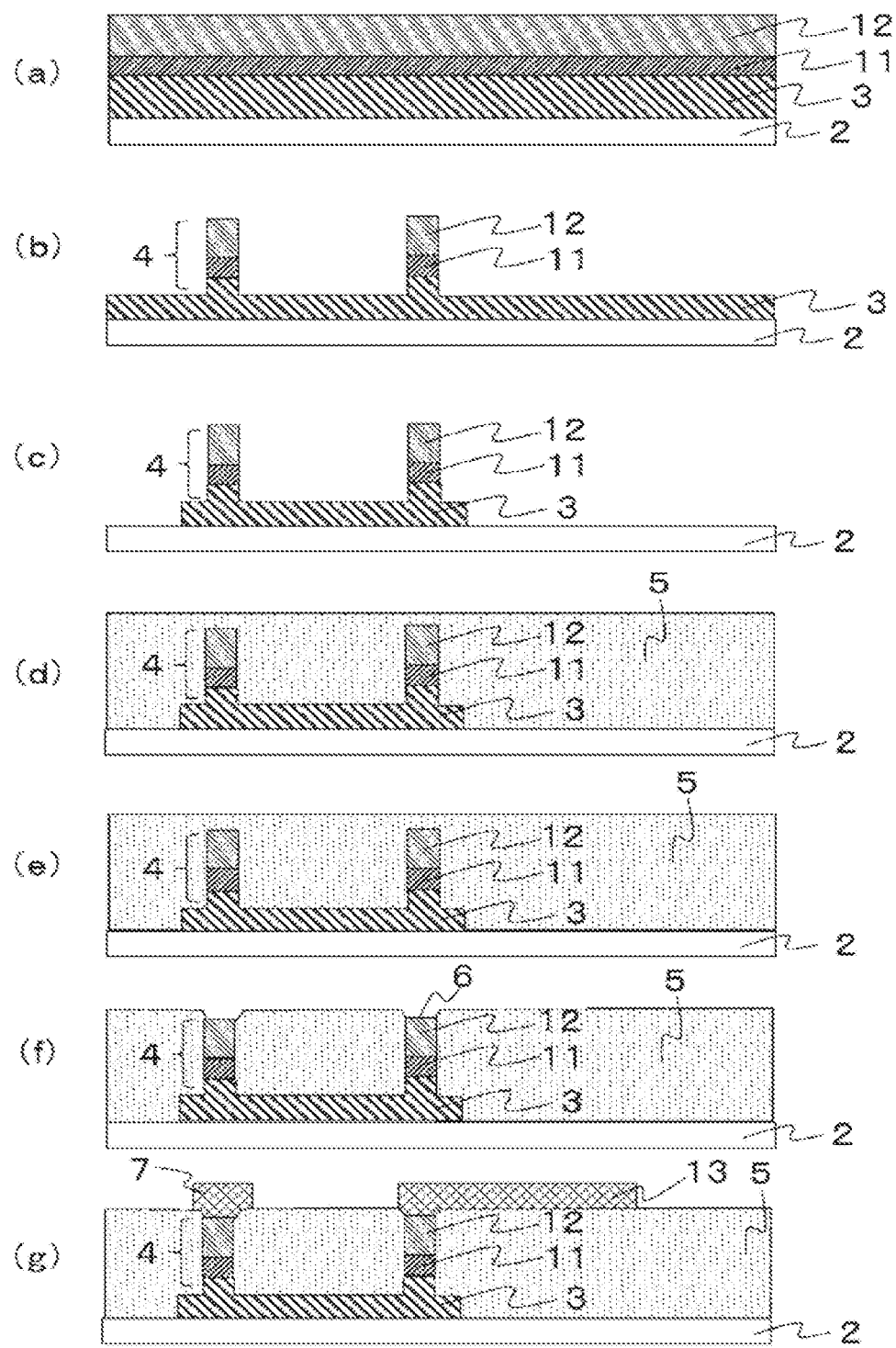
FIG. 3 shows cross-sectional views illustrating a method for manufacturing an optical semiconductor device, as seen from section line AA of FIG. 1.
Figure 4:
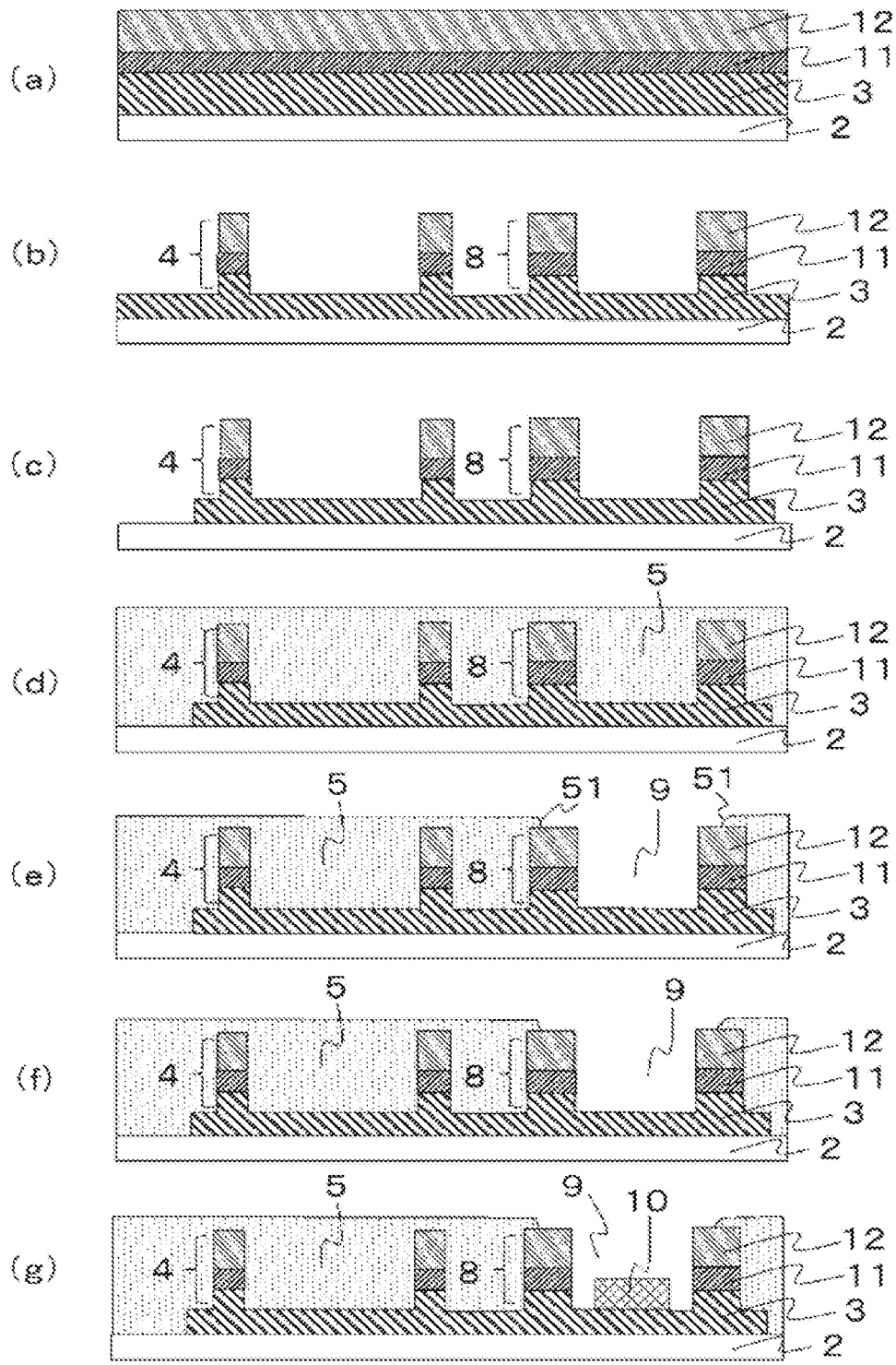
FIG. 4 shows cross-sectional views illustrating the method for manufacturing an optical semiconductor device, as seen from section line BB of FIG. 1.

Next, a method for manufacturing an optical semiconductor device in the present embodiment is described. FIG. 3 shows cross-sectional views illustrating a method for manufacturing optical semiconductor device 1, as seen from section line AA of FIG. 1. FIG. 4 shows cross-sectional views illustrating the method for manufacturing optical semiconductor device 1, as seen from section line BB of FIG. 1. FIG. 5 shows cross-sectional views for explaining a process for forming second opening 9 of FIG. 3.

As shown in FIG. 3(a) and FIG. 4(a), in the method for manufacturing optical semiconductor device 1 in the present embodiment, first semiconductor layer 3 of a first conductivity type is formed on semiconductor substrate 2, first. Then, second semiconductor layer 11 is formed on the principal surface of first semiconductor layer 3. Further, third semiconductor layer 12, which is of a second conductivity type different from the first conductivity type, is formed on second semiconductor layer 11.

Semiconductor substrate 2 is a semi-insulating semiconductor substrate made of, for example, a III-V compound semiconductor composed of Fe-doped indium phosphide (InP). First semiconductor layer 3 of the first conductivity type may be an n-type semiconductor layer having a thickness of 1.0 μm to 3.0 μm, for example.

First semiconductor layer 3 is, for example, an n-type III-V compound semiconductor composed of S-doped indium phosphide (InP). Second semiconductor layer 11 serves as an optical confinement layer of the optical waveguide. Second semiconductor layer 11 is, for example, a semiconductor layer composed of AlGaInAs or InGaAsP and having a multi quantum well (MQW) structure, with a thickness of 0.3 μm to 0.6 μm. Second semiconductor layer 11 may be composed of a stack of layers having different ratios. The upper-layer part of first semiconductor layer 3, which constitutes a lower cladding layer of mesa waveguide 4, may have a lower impurity concentration; while the lower-layer part of first semiconductor layer 3 may have a higher impurity concentration so as to reduce the contact resistance that would be caused by the formation of electrode.

Third semiconductor layer 12 is, for example, a p-type III-V compound semiconductor layer composed of Zn-doped indium phosphide (InP), with a thickness of 1.5 μm to 2.5 μm. Each of first semiconductor layer 3, second semiconductor layer 11, and third semiconductor layer 12 is formed by epitaxial growth. In order to reduce the contact resistance that would be caused by the formation of electrode in modulation portion 42, the upper part of p-type third semiconductor layer 12 may have a higher impurity concentration, or a Zn-doped p-type indium gallium arsenide (InGaAs) layer having a higher impurity concentration may be formed on the p-type III-V compound semiconductor.

Then, as shown in FIG. 3(b) and FIG. 4(b), first semiconductor layer 3, second semiconductor layer 11, and third semiconductor layer 12 are etched, thereby producing mesa waveguide 4 that constitutes an optical waveguide, and also producing mesa structure 8 at boundary 51 between second opening 9 and buried layer 5. Examples of the etching include anisotropic dry etching, such as reactive ion etching. Specifically, using a mask (e.g., a photoresist) patterned beforehand, third semiconductor layer 12 and second semiconductor layer 11 are etched, and then a part of first semiconductor layer 3 is further etched. Thus, a mesa waveguide and a mesa structure are formed at the same time.

Mesa structure 8 is located at boundary 51 between second opening 9 and buried layer 5 which will be formed in the later-described processes. In the present embodiment, second opening 9, formed as described later, has a rectangular shape surrounding second electrode 10, and thus boundary 51 between second opening 9 and buried layer 5 has the same shape, with four bent portions 52 being formed at the four corners. Mesa structure 8 is located at boundary 51 between second opening 9 and buried layer 5. Mesa structure 8 is a high-mesa structure in the shape of a rectangle in planar view, including four bent portions 52 and surrounding the four sides of second electrode 10. The rectangle is, for example, a square with a side of 100 μm to 200 μm. As shown in FIG. 1, for example, each bent portion 52 of mesa structure 8 and boundary 51 between opening 9 and buried layer 5 may have the shape of a circular arc in planar view. In this case, the circular arc shape can distribute the stress in buried layer 5, thereby suppressing the occurrence of cracks in buried layer 5. While each bent portion 52 of mesa structure 8 and boundary 51 between opening 9 and buried layer 5 has the shape of a circular arc in planar view in this example, it may instead have the shape of a part of a polygon having an obtuse interior angle.

Then, as shown in FIG. 3(*c*) and FIG. 4(*c*), a part of first semiconductor layer 3 is etched and removed to expose semiconductor substrate 2. The remaining region of first semiconductor layer 3 after the etching corresponds to the region defined by the dotted line in FIG. 1.

Then, as shown in FIG. 3(*d*) and FIG. 4(*d*), buried layer 5 is formed so as to cover semiconductor substrate 2, first semiconductor layer 3, mesa waveguide 4, and mesa structure 8. Buried layer 5 is made of resin, such as resin containing benzocyclobutene (BCB) or polyimide resin. The process for forming buried layer 5 is performed by, for example, applying a BCB solution to the upper surface of a wafer by spin coat and then heating it to develop a polymerization reaction for thermal cure. The viscosity of the solution and the rotational rate of a spin coater may be determined such that the BCB will have a thickness equal to the total height of n-type first semiconductor layer 3 and mesa waveguide 4 or mesa structure 8 plus 0.5 μm, in anticipation of the contraction due to the thermal cure. In this way, the thickness of BCB above mesa waveguide 4 and mesa structure 8 can be 1 μm or less.

Then, as shown in FIG. 3(*e*) and FIG. 4(*e*), second opening 9 is formed in buried layer 5 on the side where second electrode 10 is to be provided, so that the principal surface of first semiconductor layer 3 is exposed, and so that the upper surface of mesa structure 8 is partially exposed, with buried layer 5 partially remaining thereon. That is, second opening 9 is formed so that boundary 51 between second opening 9 and buried layer 5 is located on the upper surface of mesa structure 8. Accordingly, along boundary 51, a part of the upper surface of mesa structure 8 is exposed through second opening 9, while a part of the upper surface of mesa structure 8 on the opposite side from second opening 9 is covered with buried layer 5. Since the uppermost layer of mesa structure 8 is third semiconductor layer 12 (upper cladding layer), the formation of second opening 9 makes the upper surface of third semiconductor layer 12 partially exposed. The process for forming second opening 9 is performed by patterning a photoresist into an opening pattern beforehand, and then performing dry etching until the principal surface of first semiconductor layer 3 is exposed.

At this time, as shown in FIG. 5(*a*), the pattern of photoresist 14 transferred is such that the periphery of an opening in the mask is located on the inner side relative to the position immediately above an inner wall 81 of mesa structure 8, by the amount of mask alignment accuracy, for example. Further, as shown in FIG. 5(*b*), in light of variations in processing rate, dry etching is performed for such a period of time that could etch a BCB 1.5 times thicker than the actual BCB, for example. Thus, n-type first semiconductor layer 3 can be exposed to form second opening 9. At this time, since the side etching of the resist mask occurs, the resulting second opening 9 is larger than the original opening in the mask. The width of mesa structure 8 may be set to the sum of the amount of side etching and the double of the mask alignment accuracy. In this case, periphery 91 of second opening 9 can align with mesa structure 8, and buried layer 5 can be formed on mesa structure 8 so that boundary 51 between buried layer 5 and second opening 9 is located on the upper surface of mesa structure 8.

While a patterning method using a photoresist has been described above, a SiO$_2$ mask may be used for etching, instead. This can also reduce the amount of side etching and reduce the width of mesa structure 8.

Then, as shown in FIG. 3(*f*) and FIG. 4(*f*), first opening 6 is formed in buried layer 5 so that the upper surface of mesa waveguide 4 in modulation portion 42 is at least partially exposed. For example, in order to provide first opening 6 only in modulation portion 42 of mesa waveguide 4, a photoresist mask having an opening only at the upper part of mesa waveguide 4 in modulation portion 42 is transferred, using which buried layer 5 is etched only above mesa waveguide 4. Thus, third semiconductor layer 12 in the upper part of mesa waveguide 4 is exposed to form first opening 6.

While first opening 6 is formed after the formation of second opening 9 in the above example, this is not a limitation. Instead, first opening 6 may be formed before the formation of second opening 9.

Then, as shown in FIG. 3(*g*) and FIG. 4(*g*), first electrode 7 is formed in first opening 6 so that first electrode 7 is electrically connected to mesa waveguide 4, second electrode 10 is formed in second opening 9 so that second electrode 10 is electrically connected to first semiconductor layer 3, and electrode pad 13 is formed so that electrode pad 13 is electrically connected to first electrode 7. Electrode pad 13 is provided on buried layer 5.

The process for forming first electrode 7, second electrode 10, and electrode pad 13 starts with forming a protective film (not shown) on the upper surface of the device. Then, the protective film is masked with a resist having openings at the portions where first electrode 7, second electrode 10, and electrode pad 13 are to be formed, so that the protective film in the openings is removed. Then, a metal layer made of titanium, platinum, or gold is formed by sputtering or vapor deposition for example, and the metal layer is then lifted off. Thus, first electrode 7, second electrode 10, and electrode pad 13 can be formed. Other types of metal layer may be selected as appropriate depending on the type of the semiconductor, such as a metal with tantalum, molybdenum, or niobium.

In the case in which second electrode 10 is led to the upper surface of buried layer 5, in order to avoid unnecessary connection between the semiconductor and the electrodes, the process for removing the protective film described above may be performed with a resist mask having openings only at the portions where first electrode 7 and second electrode 10 in first opening 6 and second opening 9, respectively, are to be connected to the semiconductor. Then, after the protective film has been removed, a resist mask may be formed again for electrode formation, the resist mask having openings at the portions where first electrode 7, second electrode 10, and electrode pad 13 are to be formed.

In this way, optical semiconductor device 1 in the present embodiment can be manufactured. Optical semiconductor device 1 in the present embodiment can reduce the generation of stress in buried layer 5, specifically at second opening 9 in buried layer 5, for example, thereby suppressing the occurrence of cracks in buried layer 5 and enhancing the reliability.

Further, since the method for manufacturing optical semiconductor device 1 in the present embodiment can form mesa waveguide 4 and mesa structure 8 at the same time, optical semiconductor device 1 in the present embodiment can be manufactured without modifying methods for manufacturing conventional optical semiconductor devices.

Mesa waveguide 4 and mesa structure 8 may have different heights by selectively etching a part of the upper surface of mesa structure 8 or selectively forming an insulating film or semiconductor layer on the upper surface of mesa structure 8. This can adjust the thickness of buried layer 5 on the upper surface of mesa structure 8 and the generation of stress in the buried layer, thus suppressing cracks.

Next, the advantageous effects of the present embodiment are described with reference to FIG. 2.

As described above, optical semiconductor device 1 in the present embodiment includes mesa structure 8 surrounding second electrode 10 and located at boundary 51 between second opening 9 and buried layer 5. Further, second opening 9 is provided on the side of buried layer 5 where mesa structure 8 faces second electrode 10. A part of the upper surface of mesa structure 8 is exposed through second opening 9 on the side where mesa structure 8 faces second electrode 10, that is, in the region where mesa structure 8 surrounds second electrode 10; while a part of the upper surface of mesa structure 8 is covered with buried layer 5, having only a small thickness "a", on the side where mesa structure 8 does not face second electrode 10.

On the other hand, a conventional optical semiconductor device has no mesa structure 8. Accordingly, the side wall of an opening, which corresponds to second opening 9, is formed by buried layer 5 alone. The height of the side wall of buried layer 5 defining the opening is, therefore, equal to thickness "b" of buried layer 5, from the upper surface of buried layer 5 to first semiconductor layer 3 shown in FIG. 2.

That is, in optical semiconductor device 1 in the present embodiment, thickness "a" of buried layer 5 above mesa structure 8 and defining second opening 9 is much smaller than height "b" of the side wall defining the opening in buried layer 5 in a conventional optical semiconductor device, the height "b" corresponding to the thickness of buried layer 5, from the upper surface of buried layer 5 to first semiconductor layer 3.

The processes for producing the semiconductor and mounting the module include, after the formation of second opening 9, processes that involve heating of optical semiconductor device 1, such as a plurality of heat treatments and soldering for mounting the device. The heating of optical semiconductor device 1 causes temperature changes in optical semiconductor device 1, thereby generating thermal stress in buried layer 5 made of resin containing BCB or polyimide resin.

Specifically, buried layer 5, which is made of BCB or polyimide resin, is thermally expanded when heated. The thermal expansion generates tensile stress that forces buried layer 5 to stretch to a region where buried layer 5 is not provided. Accordingly, the boundary between second opening 9 and buried layer 5 receives the tensile stress that forces buried layer 5 to stretch to second opening 9 where buried layer 5 is not provided.

In particular, bent portions 52 of boundary 51 between second opening 9 and buried layer 5 receive the tensile stress in two directions due to the thermal expansion, thus being subjected to concentration of stress in buried layer 5. If second opening 9 is deep, buried layer 5 will have a high side wall. In this case, the entire side wall of buried layer 5 at boundary 51 between second opening 9 and buried layer 5 receives the tensile stress in the second opening 9 direction due to the thermal stress. Thus, a higher side wall of buried layer 5 causes a greater thermal stress in buried layer 5. In a conventional optical semiconductor device, therefore, the temperature changes in optical semiconductor device 1 will cause cracks in buried layer 5 at an opening (corresponding to second opening 9).

For creating an opening reaching a semiconductor layer in a buried layer, etching is performed for a prolonged period of time ("over-etching") to avoid etching residues. In the etching, once the opening has reached the semiconductor layer, the etching of the bottom of the opening is stopped, following which an increased amount of etching gas is provided to the lateral side, resulting in an increased rate of side etching.

Accordingly, a conventional optical semiconductor device, which has a thick buried layer, promotes the side etching of the lateral side of the opening in the buried layer at the depth near the semiconductor layer (remote from the upper surface of the device). This may result in an eaves-shaped cross section as shown on the left of FIG. 6, causing the peeling of electrodes and disconnection.

By contrast, optical semiconductor device 1 in the present embodiment includes mesa structure 8 at bent portions 52 of boundary 51 between second opening 9 and buried layer 5 where the thermal stress easily concentrates, as described above. Mesa structure 8 achieves significantly reduced thickness "a" of buried layer 5 defining second opening 9. Mesa structure 8 holds back most of the tensile stress that forces buried layer 5 to stretch to second opening 9 where buried layer 5 is not provided.

Practically only buried layer 5 with a thickness of "a" contributes to the thermal stress in buried layer 5 generated at boundary 51 between second opening 9 and buried layer 5. The reduced thickness of buried layer 5 at boundary 51 between second opening 9 and buried layer 5 can reduce the thermal stress in buried layer 5 at bent portions 52 of boundary 51 between second opening 9 and buried layer 5 when heat is applied, thereby suppressing the occurrence of cracks in buried layer 5.

Figure 6:
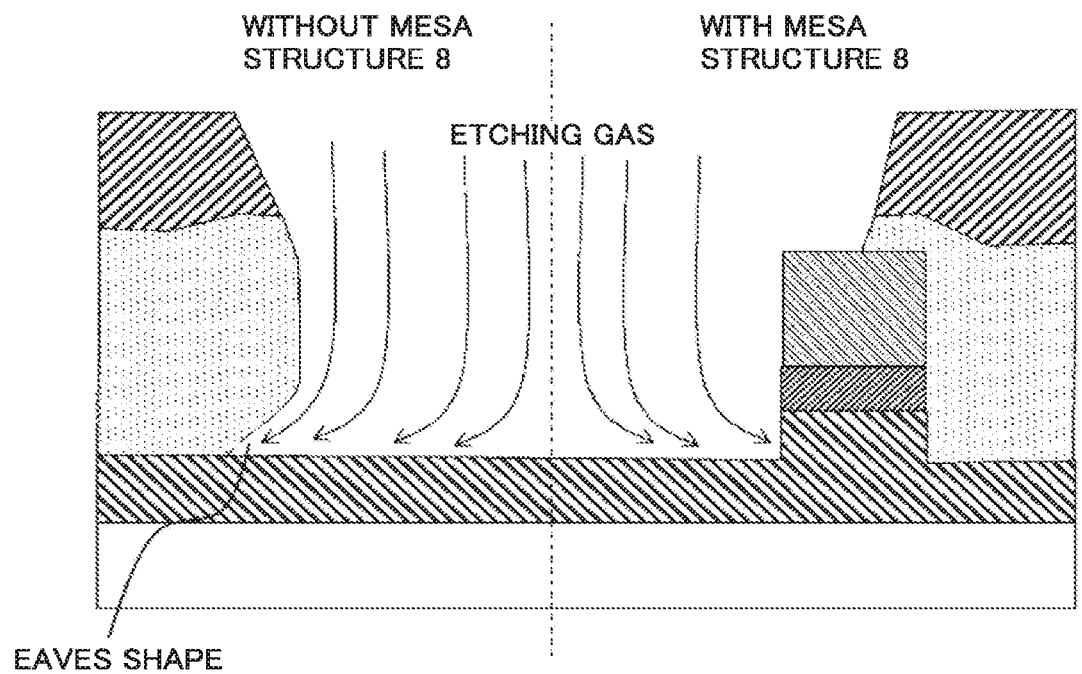
FIG. 6 illustrates the advantageous effects of the optical semiconductor device in embodiment 1 of the present invention.

Also, mesa structure 8 can prevent the above-described side etching of buried layer 5, as shown on the right of FIG. 6. Mesa structure 8 therefore can prevent the formation of an eaves-shaped cross section as shown on the left of FIG. 6, thereby preventing the peeling of electrodes and disconnection.

In the present embodiment, just providing mesa structure 8 at bent portions 52 can achieve the above-described advantageous effects. More advantageously, however, mesa structure 8 surrounds the four sides of second electrode 10, as shown in FIG. 1. This can further reduce the generation of stress in buried layer 5 at boundary 51 between second opening 9 and buried layer 5, thereby further suppressing the occurrence of cracks in buried layer 5.

In the case in which second electrode 10 is led to the upper surface of buried layer 5, the portion of buried layer 5 that defines the lateral side of the opening is only a small-thickness portion located on mesa structure 8. Therefore, the formation of the eaves shape can be suppressed, and thus the occurrence of peeling of the electrode pattern and disconnection can be suppressed.

The optical semiconductor device and the method for manufacturing the same in the present embodiment as described above can reduce the generation of stress in the buried layer, specifically at the opening in the buried layer, for example, thereby suppressing the occurrence of cracks in the buried layer and enhancing the reliability.

Further, since the method for manufacturing an optical semiconductor device in the present embodiment can form a mesa waveguide and a mesa structure at the same time, the method can manufacture the optical semiconductor device in the present embodiment without modifying the steps in a conventional manufacturing method.

In optical semiconductor device 1 in the present embodiment, mesa structure 8 surrounds the four sides of second electrode 10. This is, however, not a limitation. For example, mesa structure 8 may be only provided at least on one side that faces second electrode 10, or may be provided in L shape or U shape in planar view, as long as the advantageous effects of the present embodiment can be achieved. Mesa structure 8 may be formed only at bent portions 52 of boundary 51 between second opening 9 and buried layer 5 where the thermal stress easily concentrates. The shape of mesa structure 8 in planar view is not limited to a rectangular shape, but may be a circular or polygonal shape in planar view, as long as the advantageous effects of the present embodiment can be achieved.

Embodiment 2

Optical semiconductor device 1 in embodiment 2 of the present invention is different from that in embodiment 1 in the configuration of mesa structure 8 and therefore in the configuration of buried layer 5. In other respects, optical semiconductor device 1 in embodiment 2 is similar to that in embodiment 1. A method for manufacturing optical semiconductor device 1 in the present embodiment is similar to that in embodiment 1, and thus the description thereof is not repeated.

Figure 7:
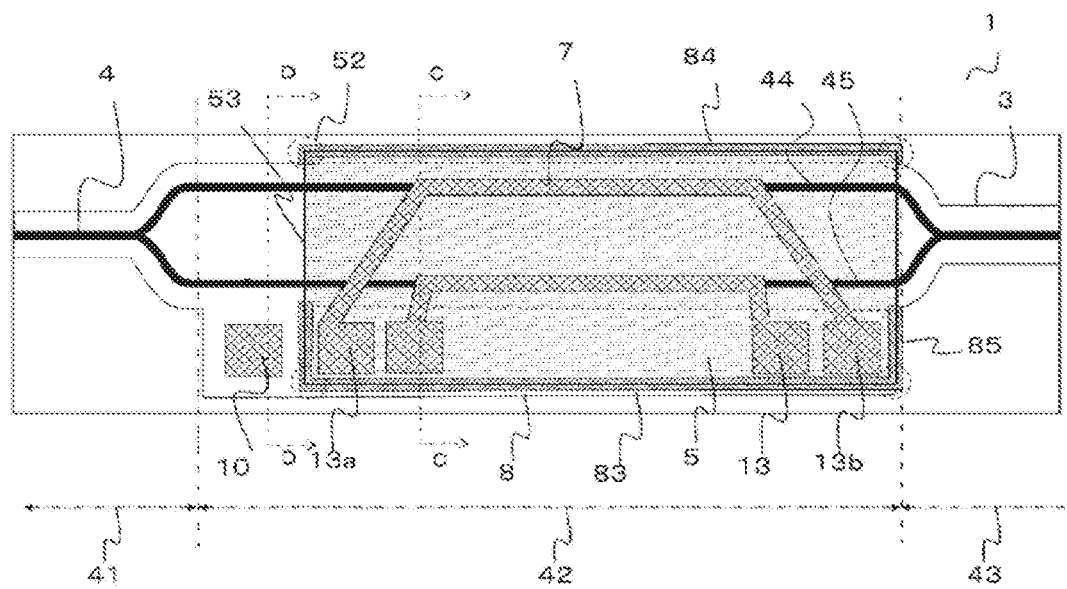
FIG. 7 shows a plan view illustrating a configuration of an optical semiconductor device in embodiment 2 of the present invention.
Figure 8:
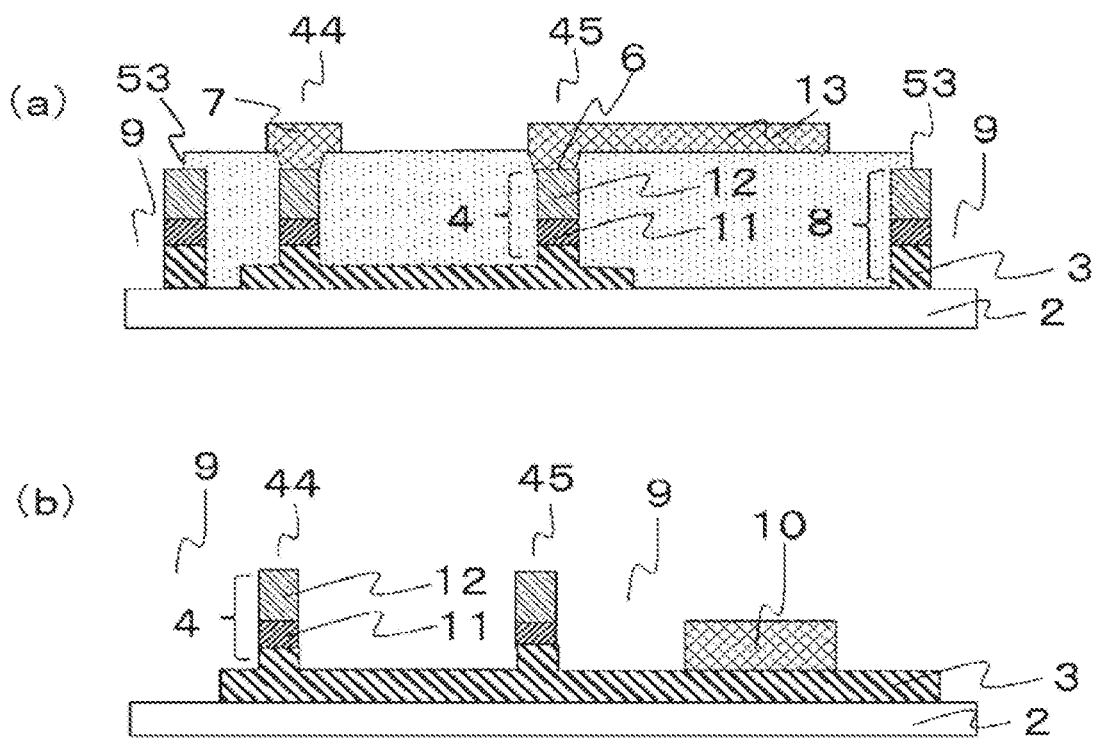
FIG. 8 shows cross-sectional views illustrating a configuration of the optical semiconductor device in embodiment 2 of the present invention.

FIG. 7 shows a plan view illustrating a configuration of an optical semiconductor device in embodiment 2 of the present invention. FIG. 8 shows cross-sectional views illustrating a configuration of the optical semiconductor device in embodiment 2 of the present invention. Specifically, FIG. 8(a) shows a cross-sectional view as seen from section line CC of FIG. 7, and FIG. 8(b) shows a cross-sectional view as seen from section line DD of FIG. 7.

Unlike embodiment 1, in optical semiconductor device 1 in the present embodiment, mesa structure 8 does not surround second electrode 10, but surrounds first optical waveguide 44, second optical waveguide 45, first electrode 7, and electrode pad 13 in modulation portion 42 of mesa waveguide 4.

Specifically, as shown in FIG. 7, mesa structure 8 includes: a first part 83 in parallel with first optical waveguide 44 and second optical waveguide 45 and facing electrode pad 13; a second part 84 in parallel with first optical waveguide 44 and second optical waveguide 45 and facing first optical waveguide 44; and third parts 85 extending from both ends of and perpendicularly to first and second parts 83, 84 toward first optical waveguide 44 or second optical waveguide 45.

At one end of first part 83, third part 85 faces second electrode 10 and extends between second electrode 10 and electrode pad 13a to the vicinity of second optical waveguide 45. At the other end of first part 83, third part 85 faces electrode pad 13b and extends to the vicinity of second optical waveguide 45. Third parts 85 extend from both ends of second part 84 to the vicinity of first optical waveguide 44. In other words, mesa structure 8 surrounds first electrode 7 and electrode pad 13 along an edge 53 of buried layer 5.

Third parts 85 of mesa structure 8 may extend to locations such that third parts 85 will not affect the light propagating through first optical waveguide 44 and second optical waveguide 45, e.g., to the locations several micrometers away from first optical waveguide 44 or second optical waveguide 45.

With such a configuration, buried layer 5 is provided in a region surrounded by mesa structure 8 as shown in FIG. 8(a). Specifically, buried layer 5 is provided in a region of modulation portion 42 of mesa waveguide 4 where first optical waveguide 44, second optical waveguide 45, first electrode 7, and electrode pad 13 are formed.

Outside of the region surrounded by mesa structure 8, no buried layer 5 is provided, with exposed semiconductor substrate 2, first semiconductor layer 3, and mesa waveguide 4, as shown in FIG. 8(b). That is, along edge 53 of buried layer 5, a part of the upper surface of mesa structure 8 on the side where buried layer 5 is provided is covered with buried layer 5, while a part of the upper surface of mesa structure 8 on the side opposite to the side where buried layer 5 is provided is exposed.

Similar to embodiment 1, as shown in FIG. 8(a), a part of the upper surface of mesa structure 8 is covered with buried layer 5, and the remaining part of the upper surface of mesa structure 8 is exposed, with edge 53 of buried layer 5 defining the boundary. That is, mesa structure 8 is formed along edge 53 of buried layer 5 so that edge 53 of buried layer 5 is located on the upper surface of mesa structure 8. Thus, buried layer 5 on mesa structure 8 is much thinner than buried layer 5 on semiconductor substrate 2 and first semiconductor layer 3.

As described above, optical semiconductor device 1 in the present embodiment includes mesa structure 8 having first part 83, second part 84, and third parts 85, as shown in FIG. 7. Mesa structure 8 is provided at edge 53 of buried layer 5 and surrounds first electrode 7 and electrode pad 13. In the present embodiment, mesa structure 8 is provided at bent portions 52 of edge 53 of buried layer 5, along edge 53. That is, a part of edge 53 of buried layer 5 that straddles first optical waveguide 44 and second optical waveguide 45 does not have mesa structure 8 but has buried layer 5 extending in a straight-line pattern between mesa structures 8, as shown in FIG. 7.

Each bent portion 52 of mesa structure 8 and edge 53 of buried layer 5 may have the shape of a circular arc or the shape of a part of a polygon having an obtuse interior angle, in planar view.

Similar to embodiment 1, optical semiconductor device 1 in the present embodiment with the above-described configuration can reduce the generation of stress in buried layer 5, for example, thereby suppressing the occurrence of cracks in buried layer 5 and enhancing the reliability.

The method for manufacturing an optical semiconductor device in the present embodiment is different from that in embodiment 1 in the locations where mesa structure 8 and buried layer 5 are formed. In other respects, the method in the present embodiment is similar to that in embodiment 1, and thus the detailed description thereof is not repeated. In the present embodiment, instead of forming second opening 9, the method includes removing a part of buried layer 5 so that the principal surface of first semiconductor layer 3 is exposed, with buried layer 5 remaining in a region where first electrode 7 and electrode pad 13 are formed. A method for removing buried layer 5 is the same as that for forming the second opening in embodiment 1, and thus the detailed description thereof is not repeated. To be brief, buried layer 5 is removed along edge 53 of buried layer 5 so that edge 53 of buried layer 5 is located on the upper surface of mesa structure 8. Further specifically, the buried layer is removed along edge 53 of buried layer 5 so that a part of the upper surface of mesa structure 8 on the side where buried layer 5 is provided is covered with buried layer 5, while a part of the upper surface of mesa structure 8 on the side opposite to the side where buried layer 5 is provided is exposed.

Similar to embodiment 1, since the method for manufacturing an optical semiconductor device in the present embodiment can form mesa waveguide 4 and mesa structure 8 at the same time, the method can manufacture optical semiconductor device 1 in the present embodiment without modifying the steps in a conventional manufacturing method.

Next, the advantageous effects of the present embodiment are described in detail. In the present embodiment, mesa structure 8 is formed along edge 53 of buried layer 5, with edge 53 of buried layer 5 being located on the upper surface of mesa structure 8. Thus, along edge 53 of buried layer 5, a part of the upper surface of mesa structure 8 is covered with buried layer 5, while a part of the upper surface of mesa structure 8 on the opposite side from the region with buried layer 5 is exposed. Accordingly, the buried layer that is located on the upper surface of the mesa structure has only a small thickness.

As has already been described above in embodiment 1, buried layer 5, which is made of resin, is subjected to thermal stress caused by processes, such as processes for producing the semiconductor and mounting the module. However, with the above-described configuration, mesa structure 8 holds back most of the tensile stress that forces buried layer 5 to stretch to the outside of edge 53 of buried layer 5 where buried layer 5 is not provided. Practically only buried layer 5 with a thickness of "a" contributes to the thermal stress in buried layer 5 generated at edge 53 of buried layer 5. The reduced thickness of buried layer 5 at its edge 53 can reduce the generation of stress in buried layer 5, thereby suppressing the occurrence of cracks in buried layer 5.

In particular, bent portions 52 of edge 53 of buried layer 5, which receive stress in a plurality of directions, are easily subjected to concentration of stress in buried layer 5. In the present embodiment, however, mesa structure 8 provided at each bent portion 52 can suppress the occurrence of cracks in buried layer 5. Also, in the present embodiment, mesa structure 8 surrounds first electrode 7 and electrode pad 13 and extends along and over a major part of edge 53 of buried layer 5 which easily receives stress. This configuration can further reduce the generation of stress in the buried layer, thereby further suppressing the occurrence of cracks in buried layer 5, as compared with embodiment 1.

As shown in FIG. 7, a part of edge 53 of buried layer 5 that straddles first optical waveguide 44 and second optical waveguide 45 does not have mesa structure 8 but has a high side wall of buried layer 5 extending to first semiconductor layer 3. However, while the thermal stress generated in buried layer 5 tends to concentrate on bent portions 52 of edge 53 of buried layer 5, buried layer 5 is in a straight-line pattern in the region straddling first optical waveguide 44 and second optical waveguide 45 between mesa structures 8 in the present embodiment, as described above. Therefore, the side wall of buried layer 5, which is in a straight-line pattern, receives less process-originated thermal stress than bent portions 52 of edge 53 of buried layer 5.

Similar to embodiment 1, the optical semiconductor device in present embodiment with the above-described configuration can reduce the generation of stress in the buried layer, for example, thereby suppressing the occurrence of cracks in the buried layer and enhancing the reliability.

In optical semiconductor device 1 in the present embodiments, mesa structure 8 can be formed only at bent portions 52, or may be formed at a part or the whole of boundary 51 between second opening 9 and buried layer 5, except the region straddling mesa waveguide 4, and except the region for second electrode 10, for example. The location of mesa structure 8 may be determined as appropriate without departing from the gist of the present embodiments. However, the location of mesa structure 8 is preferably determined so as not to affect the light propagating through mesa waveguide 4 (optical waveguide).

The embodiments of the present invention may be combined in any way or modified or omitted as appropriate, within the scope of the invention.

The present invention is not limited to the above-described embodiments, but may be modified in various ways in practice, without departing from the gist of the invention. For example, while the present embodiments describe an optical semiconductor device for use in a Mach-Zehnder modulator, this is not a limitation. The optical semiconductor device is also applicable to products for other uses, such as a semiconductor laser device including ridge or high-mesa semiconductor layers. Further, the above-described embodiments include the invention in various stages, and various inventions may be potentially extracted by appropriately combining more than one features disclosed herein.

REFERENCE SIGNS LIST

1: optical semiconductor device; 2: semiconductor substrate; 3: first semiconductor layer; 4: mesa waveguide; 5: buried layer; 6: first opening; 7: first electrode; 8: mesa structure; 9: second opening; 10: second electrode; 11: second semiconductor layer (core layer); 12: third semiconductor layer; 13: electrode pad; 14: photoresist; 41: branch portion; 42: modulation portion; 43: combining portion; 44: first optical waveguide; 45: second optical waveguide; 51: boundary between second opening and buried layer; 52: bent portion; 53: edge of buried layer

The invention claimed is:
1. An optical semiconductor device comprising:
a semiconductor substrate;
a first semiconductor layer provided on the semiconductor substrate;
a mesa waveguide provided on a principal surface of the first semiconductor layer;
a buried layer covering an upper surface of the first semiconductor layer, with a part of the upper surface of the first semiconductor layer being exposed;
a mesa structure provided at a boundary between a part of the first semiconductor layer that is covered with the buried layer and a part of the first semiconductor layer that is exposed, one side of the mesa structure being covered with the buried layer, the other side of the mesa structure being exposed; and
an electrode provided on the first semiconductor layer and electrically connected to the first semiconductor layer, wherein
the electrode is surrounded by the mesa structure and the boundary, and the electrode is provided on the part of the first semiconductor layer that is exposed.

2. The optical semiconductor device according to claim 1, wherein the mesa structure is provided at a bent portion where the boundary is bent.

3. The optical semiconductor device according to claim 2, wherein, in planar view, at least a part of the bent portion has a shape of a circular arc or a shape of a part of a polygon having an obtuse interior angle.

4. The optical semiconductor device according to claim 1, wherein
the electrode is led to an upper surface of the buried layer, and
a part where the electrode is electrically connected to the first semiconductor layer is surrounded by the mesa structure.

5. The optical semiconductor device according to claim 1, further comprising:
a first electrode provided on an upper surface of the mesa waveguide and electrically connected to the mesa waveguide;
a second electrode provided on the first semiconductor layer and electrically connected to the first semiconductor layer; and
an electrode pad electrically connected to the first electrode, wherein
the buried layer covers the semiconductor substrate, the first semiconductor layer, and the mesa waveguide at a region where the first electrode and the electrode pad are provided, with the first electrode and the electrode pad being on an upper surface of the buried layer,
the mesa structure is provided along an edge of the buried layer, with the edge being located on an upper surface of the mesa structure, and
along the edge of the buried layer, a part of the upper surface of the mesa structure on a side where the buried layer is provided is covered with the buried layer, while a part of the upper surface of the mesa structure on a side opposite to the side where the buried layer is provided is exposed.

6. The optical semiconductor device according to claim 5, wherein the mesa structure is provided at a bent portion where the edge of the buried layer is bent.

7. The optical semiconductor device according to claim 1, wherein a first thickness of the buried layer on an upper surface of the mesa structure is smaller than a second thickness of the buried layer on the principal surface of the first semiconductor layer.

8. The optical semiconductor device according to claim 1, wherein the mesa structure has a greater width than the mesa waveguide.

9. The optical semiconductor device according to claim 1, wherein the buried layer is made of resin containing benzocyclobutene or polyimide resin.

10. A method for manufacturing an optical semiconductor device, the method comprising:
forming a first semiconductor layer on a semiconductor substrate;
forming a mesa waveguide and a mesa structure on a principal surface of the first semiconductor layer;
forming a buried layer covering the semiconductor substrate, the first semiconductor layer, the mesa waveguide, and the mesa structure;
exposing a part of the principal surface of the first semiconductor layer by removing a part of the buried layer;
forming an electrode on the first semiconductor layer, the electrode being electrically connected to the first semiconductor layer, wherein
the forming of the mesa structure includes forming the mesa structure surrounding the electrode,
the exposing includes exposing a part of the principal surface of the first semiconductor layer so that the buried layer remains on one side of the mesa structure and so that the other side of the mesa structure is exposed, and
the exposing includes exposing the first semiconductor layer at a region where the mesa structure surrounds the electrode.

11. The method for manufacturing an optical semiconductor device according to claim 10, further comprising:
forming a first electrode on an upper surface of the mesa waveguide and on the buried layer, the first electrode being electrically connected to the mesa waveguide;
forming a second electrode on the first semiconductor layer, the second electrode being electrically connected to the first semiconductor layer; and
forming an electrode pad on the buried layer, the electrode pad being electrically connected to the first electrode, wherein
the forming of the mesa structure includes forming the mesa structure surrounding a region where the first electrode and the electrode pad are provided, and
the exposing includes removing the buried layer except for the region where the first electrode and the electrode pad are provided.

12. The method for manufacturing an optical semiconductor device according to claim 10, wherein the forming of the mesa waveguide and the mesa structure includes forming the mesa waveguide and the mesa structure at a same time in a same process.

* * * * *